(12) United States Patent
Akad (10) Patent No.: US 6,695,104 B2
(45) Date of Patent: Feb. 24, 2004

(54) REUSABLE IMPACT ENERGY ABSORBING DEVICE

(76) Inventor: Osman Akad, 45004 Tanglewood Ct., Utica, MI (US) 48317-4939

( * ) Notice: Subject to any disclaimer, the term of this patent is extended or adjusted under 35 U.S.C. 154(b) by 0 days.

(21) Appl. No.: 10/014,505

(22) Filed: Dec. 14, 2001

(65) Prior Publication Data

US 2002/0079177 A1 Jun. 27, 2002

Related U.S. Application Data (60) Provisional application No. 60/258,267, filed on Dec. 27, 2000, provisional application No. 60/258,269, filed on Dec. 27, 2000, provisional application No. 60/272,855, filed on Mar. 5, 2001, provisional application No. 60/286,027, filed on Apr. 24, 2001, provisional application No. 60/292,270, filed on May 21, 2001, and provisional application No. 60/305,964, filed on Jul. 18, 2001.

(51) Int. Cl.[7] ............................................. F16F 9/08
(52) U.S. Cl. .................. 188/298; 188/287; 188/315; 188/322.21
(58) Field of Search ................................. 188/284, 286, 188/287, 297, 298, 301, 313, 314, 315, 322.19, 322.2, 322.21, 322.12, 321.11; 280/740

(56) References Cited

U.S. PATENT DOCUMENTS

| | | | | |
|---|---|---|---|---|
| 713,691 A | * | 11/1902 | Schneider et al. | 89/43.01 |
| 745,582 A | * | 12/1903 | Dittbenner | 104/256 |
| 1,596,444 A | * | 8/1926 | Morinelli | 267/64.28 |
| 2,463,573 A | * | 3/1949 | Heynes | 526/338 |
| 2,802,664 A | * | 8/1957 | Jackson | 267/64.19 |
| 2,914,195 A | * | 11/1959 | Pawling | 213/43 |
| 3,052,328 A | * | 9/1962 | Brueckner | 188/289 |
| 3,151,706 A | * | 10/1964 | Dillenburger et al. | 188/322.16 |
| 3,207,270 A | * | 9/1965 | Ellis | 188/287 |
| 3,659,835 A | * | 5/1972 | Peterson | 267/136 |
| 3,774,895 A | * | 11/1973 | Willich et al. | 267/136 |
| 3,889,934 A | * | 6/1975 | Kamman | 267/34 |
| 4,130,298 A | * | 12/1978 | Shaunnessey | 280/730.1 |
| 4,500,075 A | * | 2/1985 | Tsuchiya et al. | 267/226 |
| 4,697,674 A | * | 10/1987 | Tangorra | 188/298 |
| 5,477,947 A | * | 12/1995 | Schalles et al. | 188/298 |
| 6,454,061 B1 | * | 9/2002 | Antonovsky | 188/280 |
| 6,557,674 B2 | * | 5/2003 | Vignocchi et al. | 188/315 |

* cited by examiner

Primary Examiner—Jack Lavinder
Assistant Examiner—Benjamin A Pezzlo
(74) Attorney, Agent, or Firm—Sughrue Mion, PLLC (57) ABSTRACT

An reusable impact energy absorbing device utilized a liquid filled piston and cylinder assembly whereby upon application of an impact to the piston the piston will move along the length of the cylinder and discharge the liquid outwardly through a sequence of valves into an elastic balloon structure secured to the piston and cylinder assembly to capture the fluid. The valves may be two-way valves which will allow the return of the fluid from the elastic balloon to the cylinder due to the creation of a partial vacuum in the cylinder upon upward movement of the piston when the impact force is removed. Upon discharge of the fluid from the cylinder through each valve, the fluid is forced to travel through a restricted labyrinth to further dissipate the impact energy.

5 Claims, 11 Drawing Sheets

REUSABLE IMPACT ENERGY ABSORBING DEVICE

RELATED APPLICATIONS

Applicant claims benefits of the following provisional applications:

Provisional Application No. 60/258,267 filed Dec. 27, 2000;

Provisional Application No. 60/258,269 filed Dec. 27, 2000;

Provisional Application No. 60/272,855 filed Mar. 5, 2001;

Provisional Application No. 60/286,027 filed Apr. 24, 2001;

Provisional Application No. 60/292,270 filed May 21, 2001;

Provisional Application No. 60/292,270 filed May 21, 2001; and

Provisional Application No. 60/305,964 filed Jul. 18, 2001.

BACKGROUND OF THE INVENTION

The present invention is directed to a reusable impact energy absorbing or dissipating device and more specifically to a device having a shock absorber incorporated therein comprised of a piston and a cylinder assembly filled with a liquid and provided with at least one relief valve extending through the side wall of the cylinder whereby the liquid within the cylinder will be discharged through the valve upon the application of impact pressure on the piston. The discharged fluid can additionally pass through restricted passages to dissipate energy. A balloon is connected to the top and bottom of the cylinder in a sealed manner to capture the fluid expelled from the piston through the valve. The entire piston and cylinder assembly and the balloon are further disposed within a rigid container to protect the balloon from accidental puncture. Upon removal of the impact pressure on the piston, a spring within the cylinder will return the piston to its original position thereby creating a vacuum within the cylinder. Due to the presence of the vacuum and the elastic pressure of the balloon on the liquid, the liquid will return through the valve into the cylinder whereby the system may be reused.

An energy absorbing device suitable for use with a bumper or any other impact device is disclosed in applicants previous U.S. Pat. No. 6,148,970. The device is comprised of a piston traveling within a liquid filled chamber which has a plurality of weak spots of varying thickness formed in sequence along the length of the side wall of the cylinder. A first weak spot closest to the impact receiving end of the device is the weakest of all the spots and subsequent weak spots gradually increase in strength. Upon the application of a force to the piston the liquid pressure will cause the first weak spot to rupture. If the force applied to the piston is sufficiently large, subsequent weak spots will rupture in sequence to provide a superior shock absorption mechanism. However once the weak spots have ruptured it is necessary to replace the cylinder which can be time consuming and expensive.

Other types of shock absorbing systems involving the use of shear pins, deformable tube and blowout ports for a fluid and the like are disclosed in U.S. Pat. Nos. 4,823,923, 4,641,872, 4,190,276, 4,257,581, and 3,200,584. However each of these impact dissipating devices damaged the various components to the extent that the entire system must be replaced or repaired.

U.S. Pat. No. 3,844,544 to Keilholz discloses a hydraulic shock absorber in which a damping fluid is displaced from a flexible impact receiving container through a fluid passage into a storage chamber for the damping fluid. A separating piston is provided for separating damping fluid entering the storage chamber from a compressible gas within the storage chamber. A flow control means is disposed in the fluid passage and is moveable with the separating piston for progressively reducing the rate of passage of the damping fluid into the storage chamber as the piston is moved by the damping fluid into the storage chamber whereby substantial constant damping effect results in the course of the impact receiving container receiving an impact.

U.S. Pat. No. 5,370,429 to Reuber et al. is directed to a bumper system for a vehicle. An extendable bumper is resiliently disposed in the direction of impact. The bumper system includes a cylinder, a piston disposed in the cylinder, a piston rod connected to the bumper on one end and to the piston on the opposite end, a damping fluid in cylinder contacting the piston for damping movement of the bumper, a valve, an equilibrium chamber having said damping fluid and communicating with the cylinder through the valve and a cylindrical pin having a groove, said cylindrical pins being screwed to the piston rod on one end of the piston rod opposite the piston and are guided in the equilibrium chamber. The groove is formed parallel to the piston rod and is tapered toward the bumper so that the size of the groove decreases as the bumper is retracted and connecting the cylinder with the equilibrium chamber. Thus the damping effect of the mounting means on the bumper depends upon the position of the bumper.

SUMMARY OF THE INVENTION

The present invention is directed to a reusable impact energy absorbing device associated with a bumper. The energy absorbing device is comprised of a cylinder having a piston moveable therein with a piston rod adapted to be connected to the bumper. Spring means are provided within the cylinder in contact with the piston. The cylinder is filled with a suitable fluid and one or more valves are provided in the side wall of the cylinder to absorb the energy. Upon receiving an impact the piston is moved into the cylinder to displace the fluid through the valve means directly into a chamber defined by a flexible elastic balloon having a vacuum therein or indirectly through restricted passages. Subsequent to the impact the spring within the cylinder will move the piston outwardly thereby creating a partial vacuum within the cylinder. The vacuum in combination with the pressure exerted on the fluid by the balloon will return the fluid to the cylinder through the valve.

In lieu of a piston rod connected to the bumper, the present invention also contemplates the use of a flexible bag filled with fluid which would be located in the vicinity of the bumper or within a door panel so that upon impact the flexible bag would be distorted to force the fluid out of the bag to a conduit into the cylinder having the piston movable therein.

The foregoing objects features and advantages of the invention will be set forth in the following description of the invention in conjunction with the drawings.

DETAILED DESCRIPTION OF THE INVENTION

Figure 1:
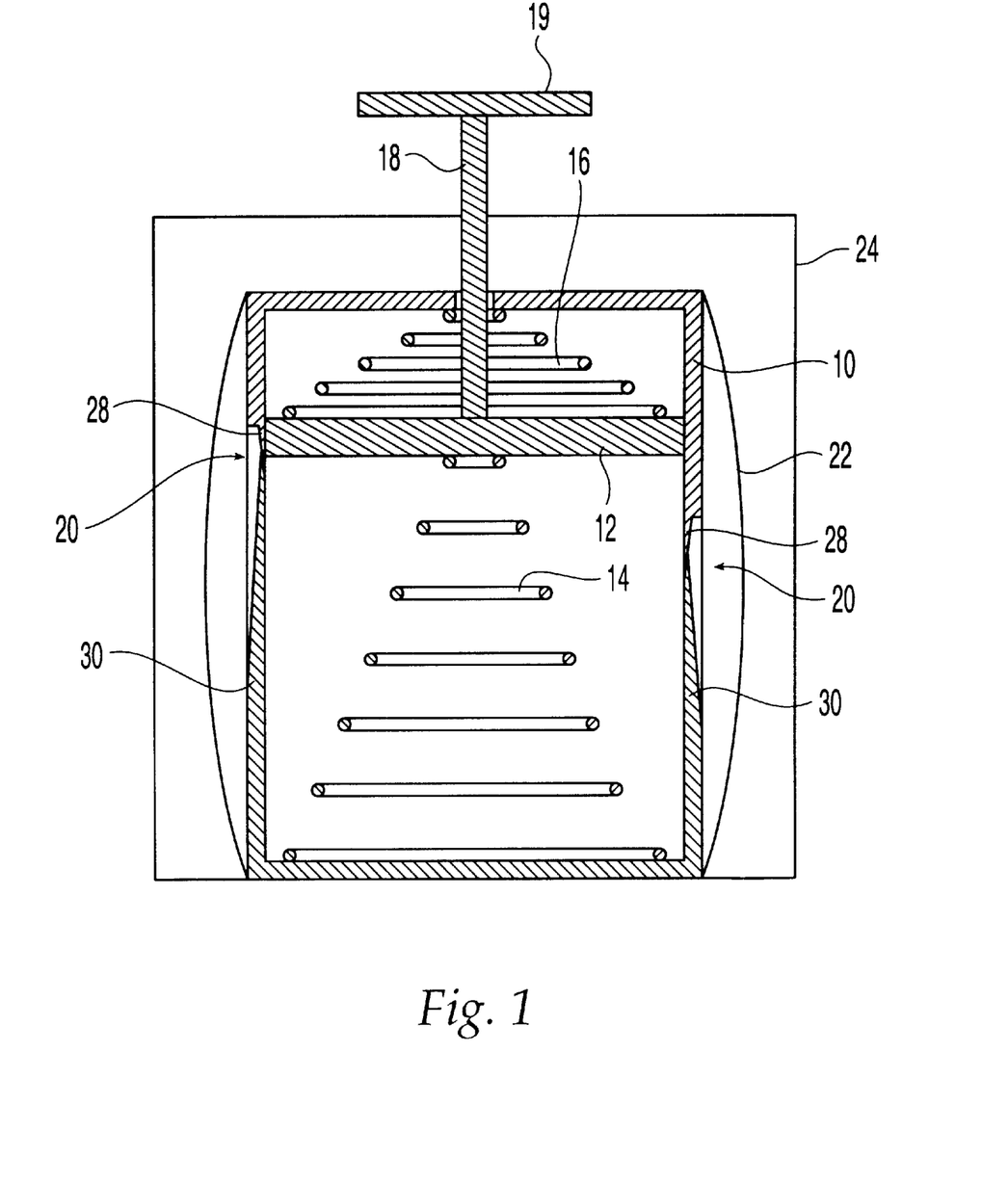
FIG. 1 is a schematic view of a first embodiment of an energy absorbing device.

A reusable impact energy absorbing device for use with a bumper is shown according to a first embodiment in FIG. 1. A cylinder (10) is provided with a piston (12) mounted for reciprocation within the cylinder. The cylinder (10) is preferably constructed from plastic material of substantial thickness to accommodate the valve assemblies in the wall of the cylinder. A metal reinforcing sleeve (not shown) may be provided on the cylinder to provide added strength. A conical coil spring (14) is mounted between the bottom of the cylinder and the piston. A coil spring (16) is mounted between the piston and the top end of the cylinder to prevent vibration and wear of the piston seals. The piston (12) is provided with a piston rod (18) adapted to be connected to a bumper or the like (19) to which an impact may be applied.

The cylinder (10) is filled with a suitable liquid and a plurality of valves (20) are disposed along the length of the cylinder to allow for the discharge of liquid upon the application of an impact force on the bumper or the like connected to the piston rod (18).

Each valve (20) is provided with a different degree of stiffness with respect to discharging the fluid from the cylinder with the weakest valve being located closest to the piston when the piston is in its normal position. The next valve along the length of the cylinder has a greater resistance to opening and the valve closest to the bottom of the cylinder is provided with the greatest resistance to opening. Thus the valves are arranged for opening in sequence along the length of the cylinder when an impact force is applied to the piston causing the piston to move downwardly within the cylinder. The liquid will be discharged into a balloon (22) or a similar structure for containing the liquid upon discharge from the valves. The balloon (22) is sealed to the cylinder by any suitable means. The balloon should be at least partially evacuated when assembled. The entire assembly is located within the housing (24) which is substantially rigid and which is designed to protect the balloon (22) from rupturing. The housing may be pressurized to provide further resistance to the expansion of the balloon and assist in the return of liquid from the balloon to the cylinder.

In operation the discharge of the liquid through the valves will absorb the impact force. The spring (14) is designed to collapse into a coil disposed in a single plane at the bottom of the cylinder. Once the impact force has been dissipated and the cause of the impact removed the spring (14) will move the piston (12) upwardly until such time as the piston is balanced between the forces of the two springs (14) and (16). As the piston moves upwardly a partial vacuum will be achieved within the lower part of the cylinder drawing the liquid back into the cylinder from the balloon. The elasticity of the balloon and the pressurized air in the housing (24) provide a force for moving the fluid back into the cylinder through the valves (20). Thus the energy absorbing device is reusable time after time.

Figure 2:
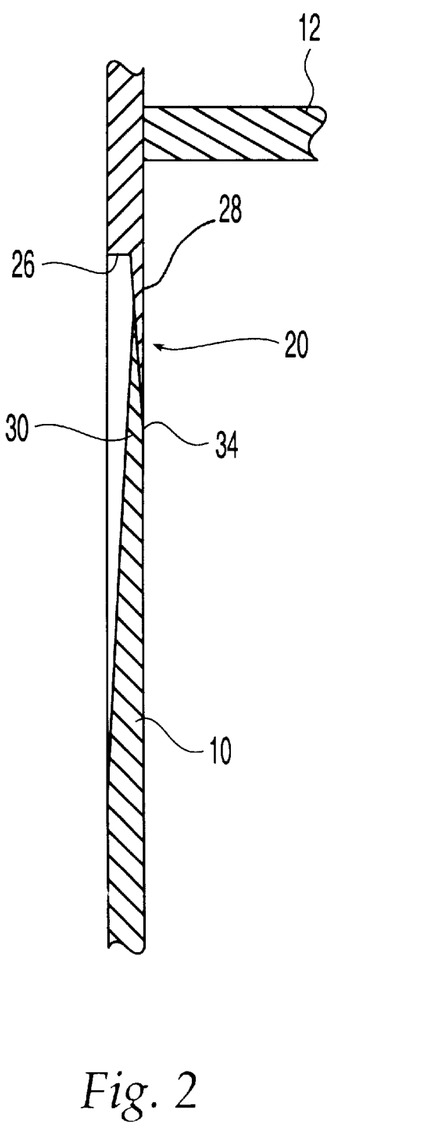
FIG. 2 is an enlarged schematic sectional view of the mating surfaces of a valve according to the first embodiment of the valve.
Figure 3:
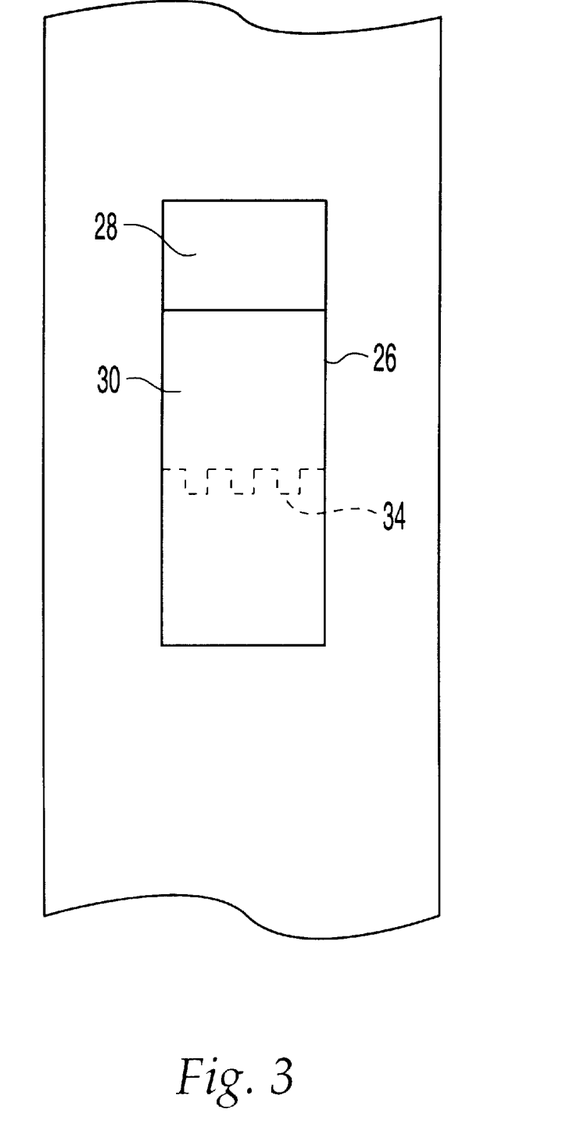
FIG. 3 is an enlarged schematic side view of the mating surfaces of a valve according to the first embodiment of the valve.

The construction of the valves (20) is shown in detail in FIGS. 2 and 3. The cylinder wall (10) is provided with a rectangular aperture (26) in which an upper leaf spring (28) and a lower leaf spring (30) are located in contact with each other. The leaf springs (28, 30) are of integral one-piece molded construction with the cylinder (10) but are not secured to each other or to the side walls of the aperture (26). Thus the upper and lower leaf springs (28, 30) are free to flex in response to the pressures exerted on them from the liquid in the cylinder. The lower edge (34) of the leaf spring (28) is formed with a plurality of spaced apart teeth as best seen in FIG. 3.

The leaf spring (28) is more flexible than the leaf spring (30) due to the fact that it has a thinner dimension. Upon downward movement of piston (12) the liquid within the cylinder will flex the upper leaf spring (28) outwardly which in turn will exert sufficient pressure on the thinner upper portion of the leaf spring (30) which will also flex outwardly. As a result a gap will be formed between the opposed surfaces of the upper and lower leaf springs (28, 30) and due to the uneven lower edge (34) the liquid will be forced outwardly of the cylinder into the balloon (22) as shown in FIG. 1. The lower edge (34) may be wavy instead of having spaced apart teeth to allow the fluid to exit from the cylinder. The side edges of the leaf springs (28, 30) are in close sliding engagement with the side walls of the aperture (26) so that any leakage of fluid past the side walls is negligible.

The flexing resistance of the valve (20) can be varied by varying the thickness dimensions of the leaf springs (28, 30) as well as the area. As mentioned previously, when two or more valve assemblies (20) are provided along the length of the cylinder the valve assemblies closest to the piston in the neutral position have the least resistance and valve assemblies closest to the bottom of the cylinder have the greatest resistance to flexing. Thus, as best seen in FIG. 1 the two valve assemblies (20) are illustrated with the upper leaf springs (28) having substantially the same dimensions but the lower leaf springs (30) differ from each other. The lower leaf spring (30) on the right as viewed in FIG. 1 is lower and has a greater thickness dimension and/or area than the lower leaf spring (30) on the left.

The uppermost valve or valves may be constructed as one-way valves to only allow discharge of liquid from the cylinder by simply placing the leaf spring (28) outwardly of the leaf spring (30) so that it can only flex outwardly. The lowermost valve would be a two-way valve as shown.

Figure 4:
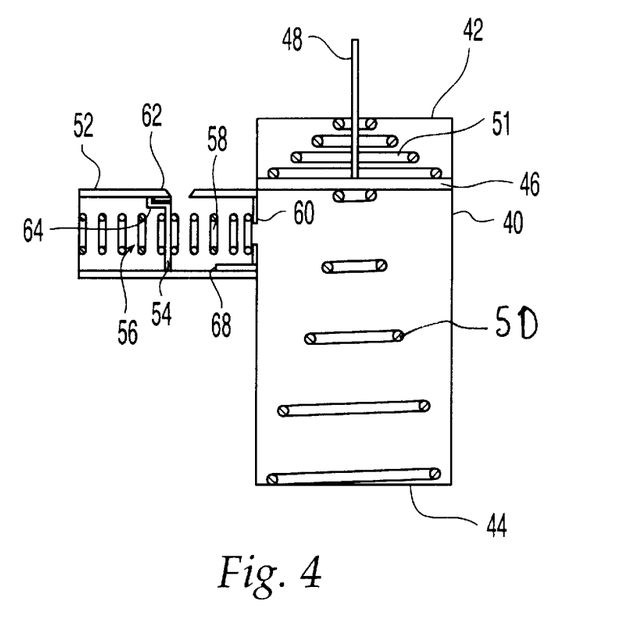
FIG. 4 is a schematic view of a piston and cylinder arrangement with a side wall valve according to a second embodiment.

A second embodiment of the energy absorbing device is shown in FIGS. 4–7 inclusive. As shown in FIG. 4 the cylinder (40) is closed at the opposite ends (42) and (44) and a piston (46) is slidably mounted for reciprocation within the cylinder. The piston is provided with a piston rod (48) extending outwardly through an opening in the top (42) for connection with a bumper or other suitable device adapted to receive an impact. The spring (50) is a conical coil spring to allow the piston (46) to have a greater length of travel. A spring (51) is also be located between the top wall (42) and the piston as shown in the embodiment of FIG. 1. A valve assembly comprised of a cylinder (52), a piston (54) and two springs (56) and (58) located on opposite sides of the piston is mounted on the side wall of the cylinder (40) in overlapping relation to an outlet (60) in the wall of the cylinder (40).

Figure 5:
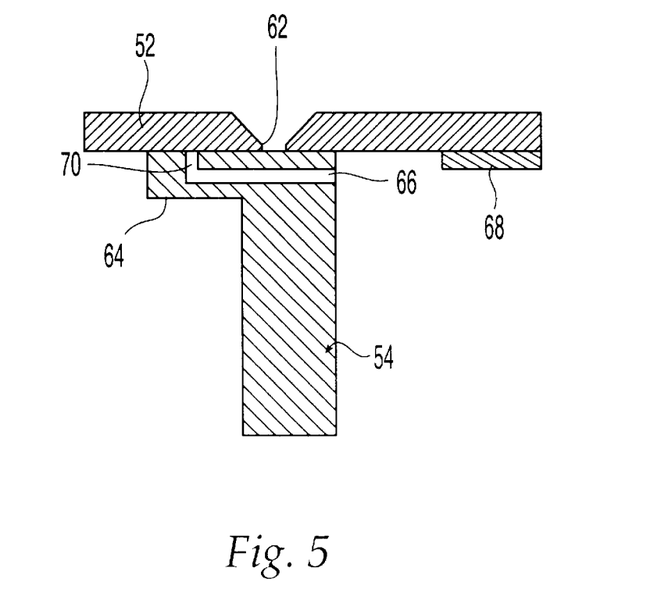
FIG. 5 is an enlarged schematic cross-sectional showing of the valve assembly shown in FIG. 6.

When an impact is applied to the piston (46) through the piston rod (48) the piston (46) will move downwardly in the cylinder (40) against the force of the spring (50) and the fluid within the cylinder. The fluid will be forced outwardly through the opening (60) into the valve assembly to move the piston (54) outwardly away from the cylinder (40) against the resistance of the spring (56) until the outlet (62) is uncovered. A partial enlarged view of the piston (54) and the wall of the cylinder (52) with the outlet (62) therein is shown in FIG. 5. The piston (54) is provided with a skirt (64) having a passage (66) extending therethrough from the face of the piston (54) closest to the cylinder (40) to an opening at the opposite end thereof which is adapted to align with the outlet (62) when the piston (54) is moved back toward the cylinder (40) when the piston (46) is being restored to its original position by the spring (50). The piston (54) can move toward the cylinder (40) until it engages the abutment (68) on the inside wall of the cylinder (52). In this position the opening (70) of the passage (66) will be aligned with the outlet (62) to allow fluid to return through the passage (66) and the opening (60) to refill the cylinder (40). Once again a balloon (72) is secured to the cylinder (40) as shown in FIG. 7 to receive and hold the fluid expelled from the cylinder (40).

Figure 6:
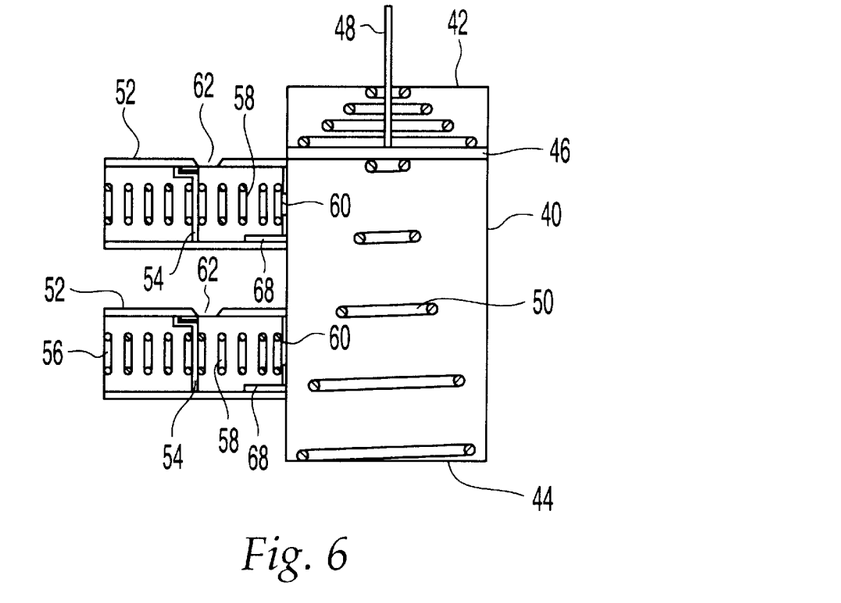
FIG. 6 is a schematic view of the piston and cylinder assembly with a multiple valve arrangement according to the second embodiment of the invention.
Figure 7:
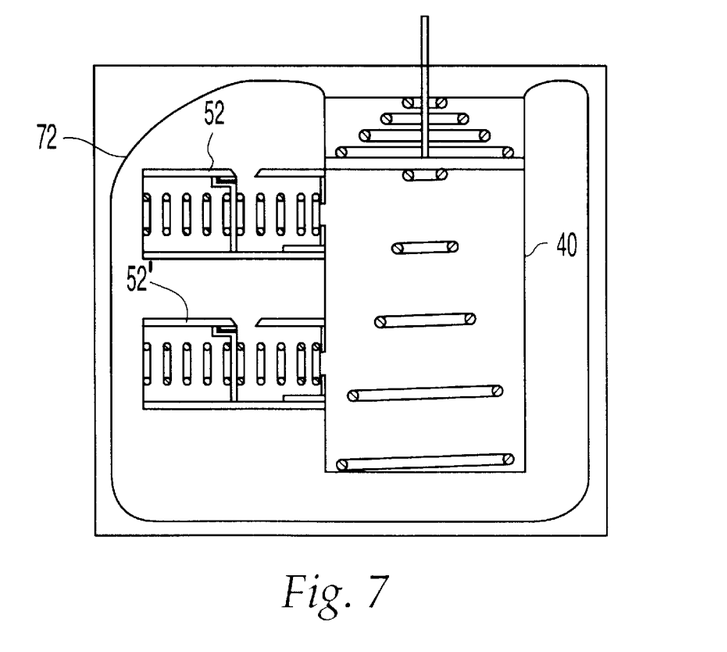
FIG. 7 is a schematic view similar to FIG. 6 with the addition of a balloon for holding the fluid discharged from the valve and a protective container surrounding the balloon.

As shown in FIGS. 6 and 7 a plurality of valve assemblies (52, 52') may be mounted on the wall of the cylinder (40) and will operate in the manner shown and described with respect to FIG. 4. The force of the spring (56) may be varied so that the valve assembly (52) closest to the top of the cylinder (40) will open before the valve assembly (52') closest to the bottom. An even greater number of valve assemblies can be mounted on the wall of the cylinder along the length of the cylinder (40).

In addition to varying the strength of the springs of the valves, the responsive reaction may be additionally controlled by varying the outlet area of the openings (60) leading to valve members. Likewise, weakness of the portions to be ruptured in U.S. Pat. No. 6,148,970 can be controlled by varying the area or shape of the portion to be ruptured instead of varying the thickness of the portion.

Figure 8:
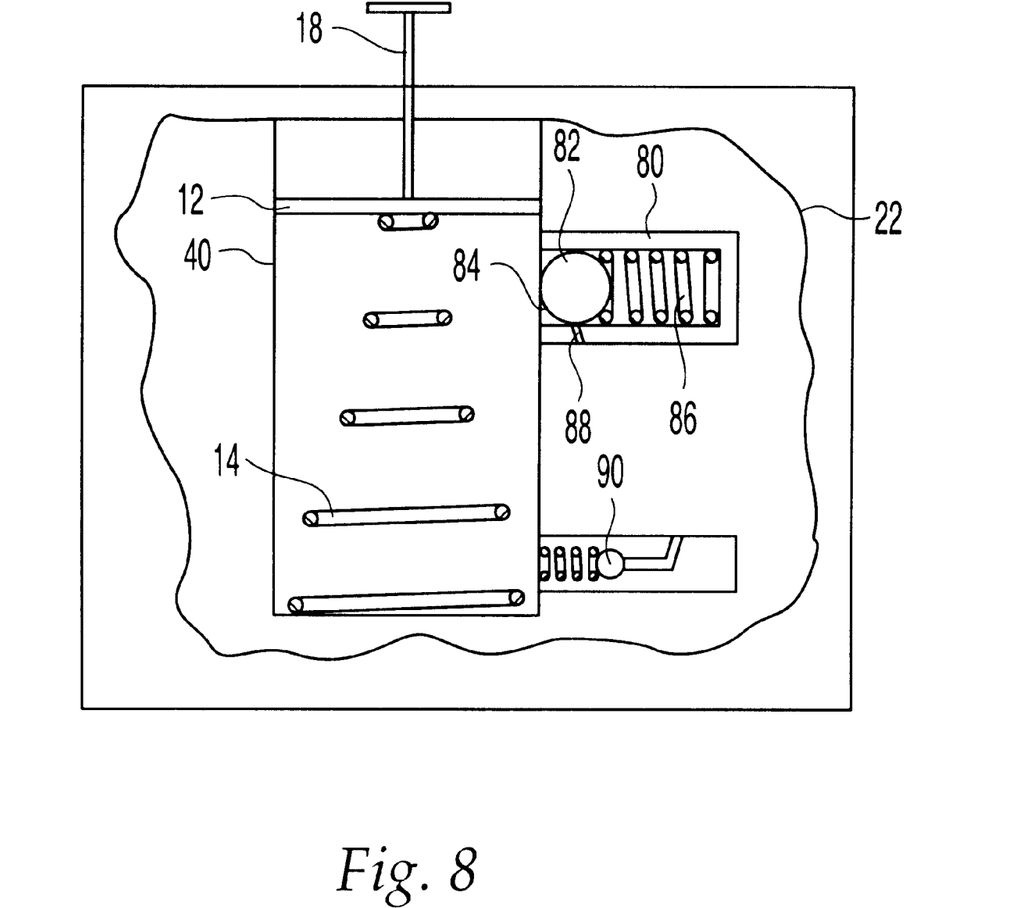
FIG. 8 is a schematic view of a piston and cylinder assembly with a valve arrangement according to a third embodiment of the present invention.

A third embodiment of the invention is shown in FIG. 8. The construction is similar to the embodiment shown in FIG. 7 in so far as the overall arrangement of the piston and cylinder assembly is concerned with the balloon being secured to the piston. However instead of having two-way valve assemblies as shown in the first and second embodiments a plurality of one-way valve assemblies are provided along the length of the cylinder (40) which will only permit fluid to flow from the cylinder (40) into the balloon (22) upon movement of the piston (12) downwardly when an impact force is applied through the piston rod (18). Only one outlet valve for the fluid in the cylinder (40) has been shown in the embodiment of FIG. 8 and is comprised of a valve housing (80) having a ball (82) moveable therein from a first position as shown in FIG. 8 wherein the ball (82) closes the opening (84) in the wall of the cylinder (40). When the fluid within the cylinder (40) is pressurized the ball will be moved outwardly against force of the spring (86) until the ball (82) uncovers the fluid passage (88) thereby permitting the fluid to flow directly from the cylinder (40) to the balloon (22). The strength of the spring (86) in each successive valve may be increased to provide the sequential operation similar to that described in the previous embodiments. When the spring (14) is fully compressed and the force is removed from the piston (12) the spring (14) will then move the piston (12) upwardly creating a vacuum within the cylinder (40). This in turn will open the one-way valve (90) which is located adjacent the bottom of the cylinder (40) to allow the fluid to return into the cylinder (40) for a subsequent impact operation.

Figure 9A:
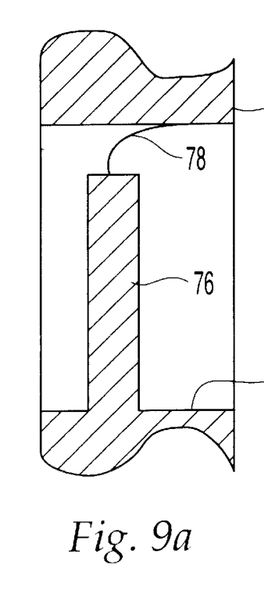
FIGS. 9a–9d are schematic cross-sectional views of a valve assembly according to a fourth embodiment in different positions of operation.
Figure 9B:
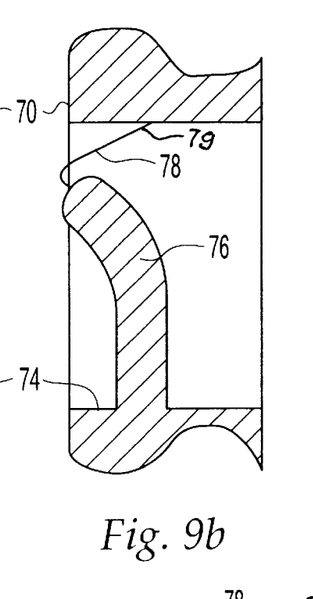
Figure 9C:
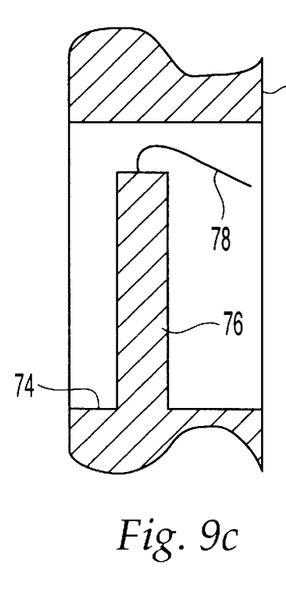
Figure 9D:
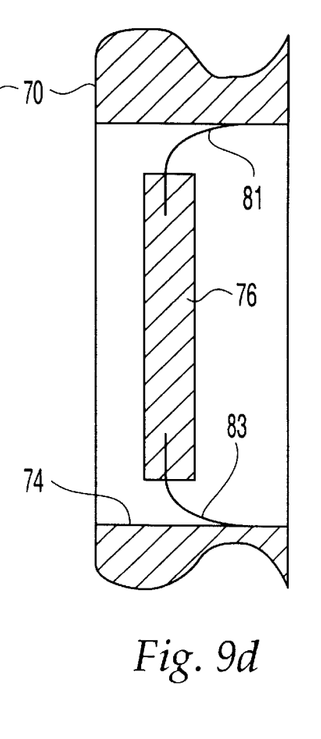
Figure 9E:
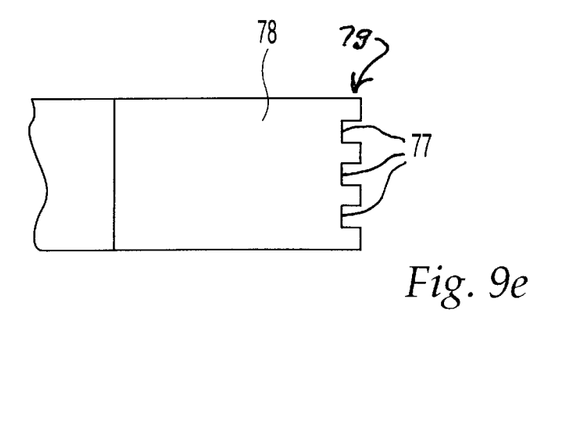
FIG. 9e is a plan view of one end of the flexible skirt shown in FIGS. 9a–9d.

A fourth embodiment of the present invention is shown in FIGS. 9a–9e. This embodiment is similar to the embodiment of FIG. 1 in as much as the plastic wall (70) of the cylinder is provided with a plurality of apertures (74) along the length thereof. A valve member (76) is formed of integral molded one-piece construction with the cylinder wall but is considerably thinner than the cylinder wall to allow for flexibility of the valve member. The opposite sides of the valve member (76) are not secured to the side walls of the aperture (74) but provide a close fit thereto to reduce fluid leakage. A flexible skirt (78) is secured to the upper end of the valve member (76) by any suitable means. The skirt member can be formed of relatively thin metallic material which will provide a spring effect to the skirt to normally bias the skirt the member (78) into fluid tight engagement with the upper wall of the aperture (74). The metallic skirt member (78) may be plastic coated if necessary and can be embedded directly into the end of the valve member (76). The sides of the skirt (78) are in close frictional sliding engagement with the side walls of the aperture to provide a substantial sealing effect. To aid in understanding the operation, the right hand side of each the views shown in FIGS. 9a–9d, is the interior of the cylinder. Thus, as shown in FIG. 9a, when there is no pressure being exerted on the piston (12) the valve member (76) will remain in the straight condition with the skirt (78) biased into engagement with the upper surface of the opening. Thus the fluid within the cylinder will substantially be prevented from passing through the opening (74). When an impact force is transmitted through the piston (12) the pressure on the fluid within the cylinder will be increased bending the valve member (76) to the left as shown in FIG. 9b. The end portion (79) of the skirt (78) as shown in FIGS. 9b and 9e will no longer be flush with the upper surface of the opening (74) and the gaps 77 in the end portion (79) will allow the fluid to exit from the cylinder into the elastic balloon (22). Once the impact has been removed and the main spring (14) moves the piston (12) upwardly within the cylinder a reduced pressure will be created within the cylinder. The valve member (76) will return to the straight position as shown in FIG. 9c and the force of the fluid returning from the balloon (22) to the cylinder (70) will simply bend the skirt (78) downwardly to allow the passage of the fluid back to the cylinder.

A variation of this construction is shown in FIG. 9d wherein the valve member (76) may be provided with substantial clearance between the side walls of the opening (74) skirts (81, 83) which are similar in construction to the skirt member (78) may be secured to the sides of the valve member (76) whereupon they will be biased into sliding engagement with the side walls of the opening (74). This will provide a better fluid seal to prevent fluid from seeping outwardly from the interior of the cylinder to the balloon. Such side skirts may be provided on the valve members (28, 30) as shown in FIGS. 1 and 2.

Figure 10:
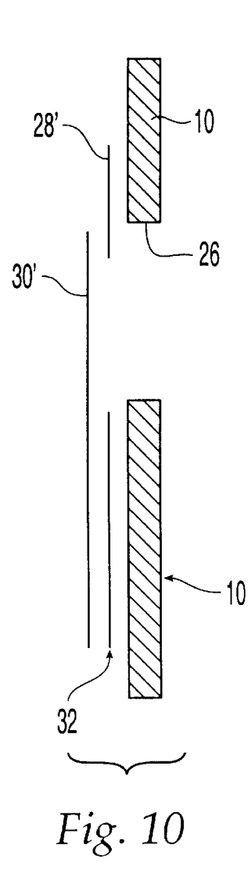
FIG. 10 is a schematic side elevation sectional view of a valve assembly according to a fifth embodiment of the invention.
Figure 11:
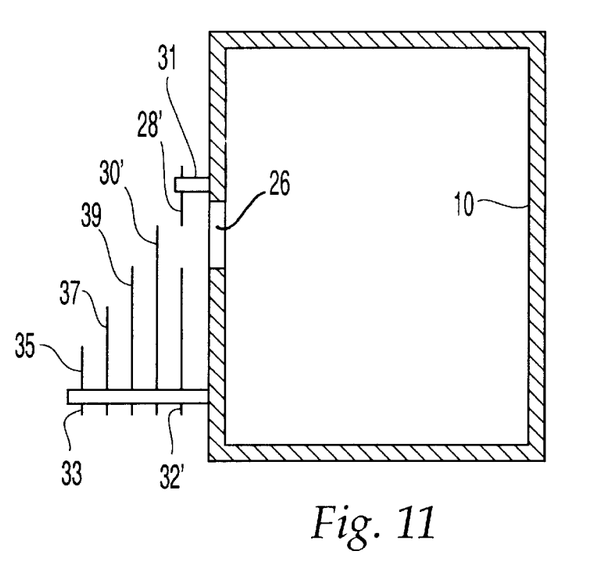
FIG. 11 is a schematic side view, partly in section, showing a modified arrangement of the fifth embodiment.

A fifth embodiment of the present invention is shown in FIGS. 10–13 inclusive wherein the flexible plastic leaf springs (28, 30) of FIG. 1 are replaced by metallic leaf springs (28', 30'). Although the leaf springs may be slightly curved to match the curvature of the cylinder (10) it is preferred that the leaf springs (28', 30') be flat so that the curvature will not in any way effect the bendability of the leaf springs. Although the leaf springs are shown spaced from the cylinder and from each other in FIGS. 10–12 the spacing is only for purposes of illustration. The leaf springs are superimposed in contact with adjacent springs. The leaf spring (28') is secured above opening (26) as shown in FIG. 11 by means of a rivet (31). A plurality of leaf springs of varying size and strength are secured below the opening (26) by means of a rivet (33). The number of leaf springs secured below the opening in overlapping relation to the leaf spring (28') can vary from 2 as shown in FIG. 10 to any number depending upon the degree of resistance desired to the flexing of the leaf spring (28') outwardly due to the pressurized fluid within the cylinder.

The leaf spring (28') is provided with a c-rated or wavy lower edge similar to the lower edge of the leaf spring (28) in FIG. 3. The leaf spring (28) and the leaf spring (30'), as well as the additional leaf spring (35, 37, 39), are disposed in overlying relation to each other in the order shown in FIG. 11 to provide a fluid type seal across the opening (26). When flat leaf springs are used the surface of the cylinder may be flattened in the vicinity of the opening to increase the fluid type character of the seal. Upon impact the piston (12) within the cylinder (10), as shown in FIG. 1, will move downwardly and force the fluid within the cylinder outwardly past the leaf springs. The leaf spring (28') will flex outwardly bending the leaf spring (30') as well as the leaf springs outwardly therefrom to allow the fluid to escape through the serrated lower edge of the leaf spring (28').

Subsequent to the impact the spring within the cylinder (10), as shown in FIG. 1, will move the piston (12) upwardly thereby creating a vacuum and drawing the fluid from the surrounding balloon (22) back into the cylinder through the opening (26). The pressure exerted by the fluid in the balloon will flex the leaf spring (28') inwardly sufficiently to provide a gap between the leaf spring (30') and the leaf spring (28) thereby allowing the fluid to return to the cylinder.

Figure 12:
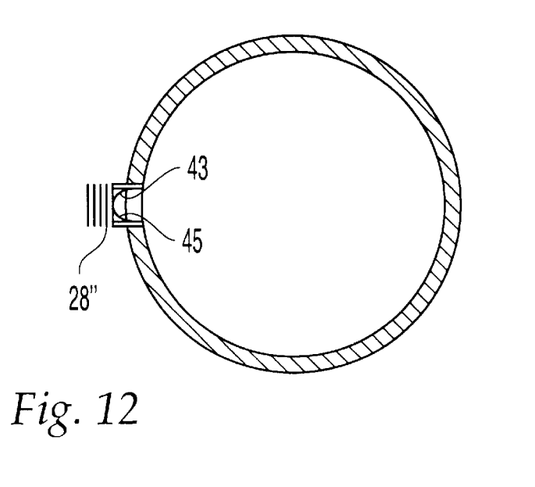
FIG. 12 is a cross-sectional view of the arrangement shown in FIG. 11 with a modified valve construction.

The schematic illustration in FIG. 12 shows the flat nature of the leaf springs with the leaf spring (28") having a projection into the opening (26). The projections are comprised of a pair of skirts (43, 45) similar to the skirts (81, 83) shown in FIG. 9d. This will further enhance the fluid tightness of the valve arrangement.

Figure 13:
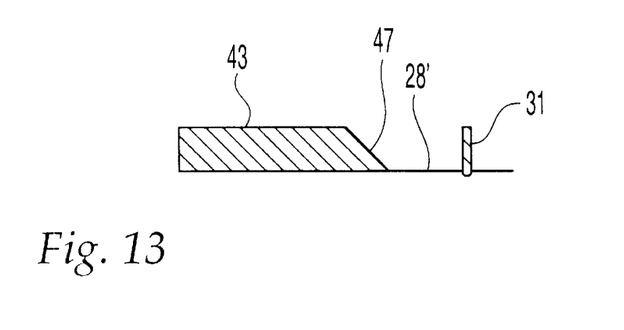
FIG. 13 is a side elevation view of the modified valve construction in FIG. 12.

FIG. 13 is a side view of the inner spring (28') and the skirt (43) thereon. The uppermost edge of the skirt (43) is indicated at (47) and is beveled so that upon inward flexing of the leaf spring (28') the skirt will not interfere with the top wall of the opening (26).

Figures 14, 15:
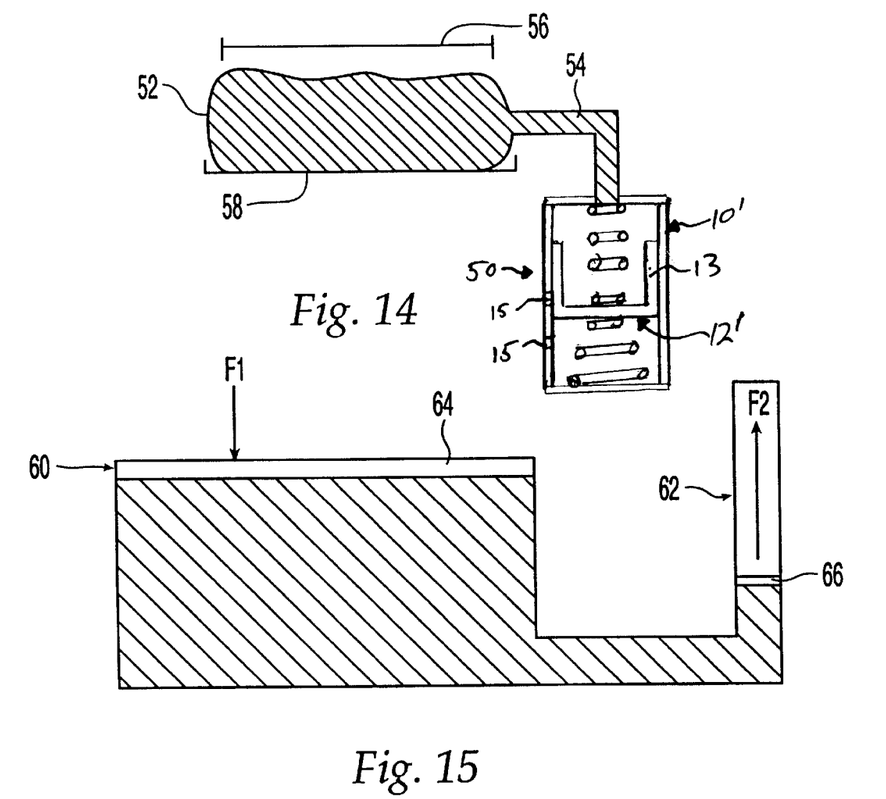
FIG. 14 is a schematic view of a modification of the embodiment of FIG. 1.
FIG. 15 is an explanatory view of the principle involved in FIG. 14.

FIG. 14 shows an arrangement similar to the embodiment of FIG. 1 wherein a piston and cylinder assembly (50) is provided which is similar to that shown in FIG. 1 with the exception of the piston (12') which is not provided with a piston rod extending outwardly of the cylinder for connection to an impact receiving device. In the arrangement of FIG. 14 a flexible liquid filled bag (52) is provided for receiving the impact. A flexible hose or the like (54) is connected between an outlet of the bag (52) and an inlet at the upper end of the cylinder (10'). The bag (52) could be located between an outer door panel (56) and an inner door panel (58) so that upon impact the outer door panel (56) would be pressed against the bag (52). The impact force would be transmitted through the flexible hose (54) to the piston (12') in the cylinder (10'). The piston 12' also differs from the piston in FIG. 1 since the piston 12' is provided with a skirt 13 which has sufficient length as to cover all of the valve outlets 15 shown schematically in FIG. 14 after activation by impact. Thus fluid discharged from the cylinder cannot reenter the cylinder above the piston.

FIG. 15 is an explanatory schematic view of the principle involved in the arrangement of FIG. 14. A large diameter piston and cylinder assembly (60) is connected with a smaller diameter piston and cylinder arrangement (62). The piston and cylinder assembly (62) could be identical to the embodiments described above. Since the force is equal to the pressure times the area and assuming the surface area (64) of the liquid in the cylinder (60) is ten times greater than the surface area (66) of the smaller piston and cylinder assembly (62) the force (F2) would be equal to the force (F1) divided by 10. Thus the impact force applied to the energy absorbing device (62) would be substantially less than the impact force applied to the piston and cylinder assembly (60) and the amount of fluid to be discharged would be substantially less.

Figure 16:
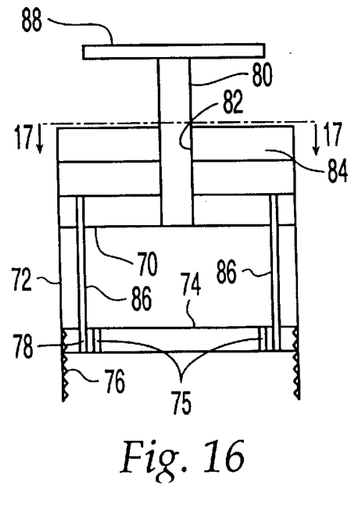
FIG. 16 is a schematic view of a sixth embodiment according to the present invention.
Figure 17:
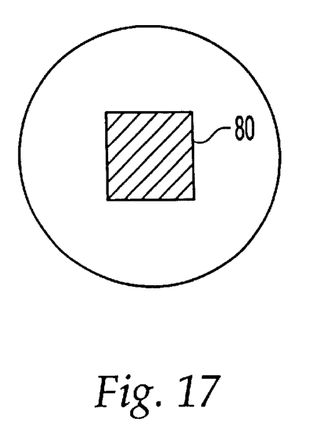
FIG. 17 is a sectional view taken along the line 17—17 in FIG. 16.

FIGS. 16 and 17 disclose a sixth embodiment of the present invention wherein the need for springs on opposite sides of the piston as shown in FIG. 1 is eliminated. As shown in FIG. 16 a piston (70) is slidably mounted within a cylinder (72). A second piston (74) is spaced below the first piston (70) but is mounted for rotational as well as axial movement by means of complementary splines (76) in the inner wall of the cylinder (72, 78) on the outer surface of the piston (74).

The piston (70) is connected to a piston rod (80) which has a rectilinear cross-section as best seen in FIG. 17. The passage in the cover (84) has a cross-section complimentary to that of the piston rod (80) so that the piston rod (80) cannot rotate relative to the cover (84) which is rigidly secured to the cylinder (72). The piston (70, 74) are non-ratably connected to each other by a plurality of connecting pins (86) extending between the two pistons. The piston (74) is provided with fluid passages (75).

When an impact is applied to the impact receiving plate (88) connected to the piston rod (80) the piston rod (80) and the pistons (70, 74) will move downwardly within the cylinder (72). Due to the spline connection between the piston (74) and the cylinder (72) the pistons (74, 70) will rotate as the pistons move downwardly. Since the piston rod (80) cannot rotate, the rotational force applied to the piston rod by the pistons (70, 74) will cause a tortional deformation of the piston rod as well as a deformation of the pins (86). Upon removal of the impact force the piston rod and pins will untwist to restore the pistons to the previous position thereby eliminating the need for springs associated with the piston.

Figure 18:
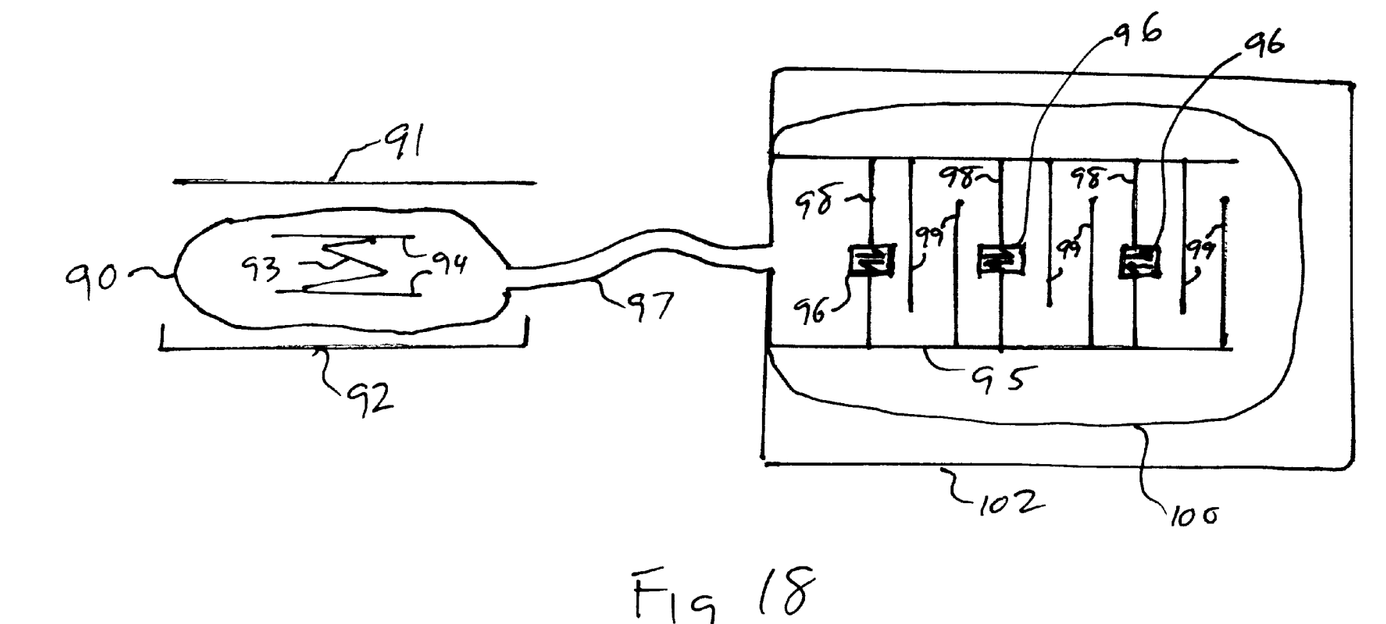
FIG. 18 is a schematic view of a seventh embodiment according to the present invention.

FIG. 18 discloses a seventh embodiment of the present invention. A flexible, non-expandable impact receiving bag (90) is located between an impact receiving plate (91) such as an outer door panel, and an inner backing plate (92). A conical spring (93) is disposed in the bag (90) between two return plates (94) which will prevent puncturing of the bag (90) by the spring and also provide a uniform expansion of the bag (90) by the spring (93) upon removal of the impact.

The bag (90) is connected to a cylinder (95) by means of a flexible reinforced hose (97). Three transverse plates (98) extend transversely within the cylinder (95) in spaced relation along the length of the cylinder. A two-way valve (96) is located in each plate (98) with the pressure resistance of each valve being different from the other. The weakest valve (96) is disposed closest to the connection of the hose (97) to the cylinder (95). A plurality of offset baffles (99) are disposed downstream of each valve (96) to provide a substantial resistance to the flow of the fluid from the hose (97) to the expandable flexible balloon (100) as a result of the fluid shearing resistance. The balloon (100) and the surrounding protective housing (102) are similar to the previous balloons and housing described in other embodiments. Other types of fluid shearing passages could be utilized in lieu of the disclosed passage.

Figure 19:
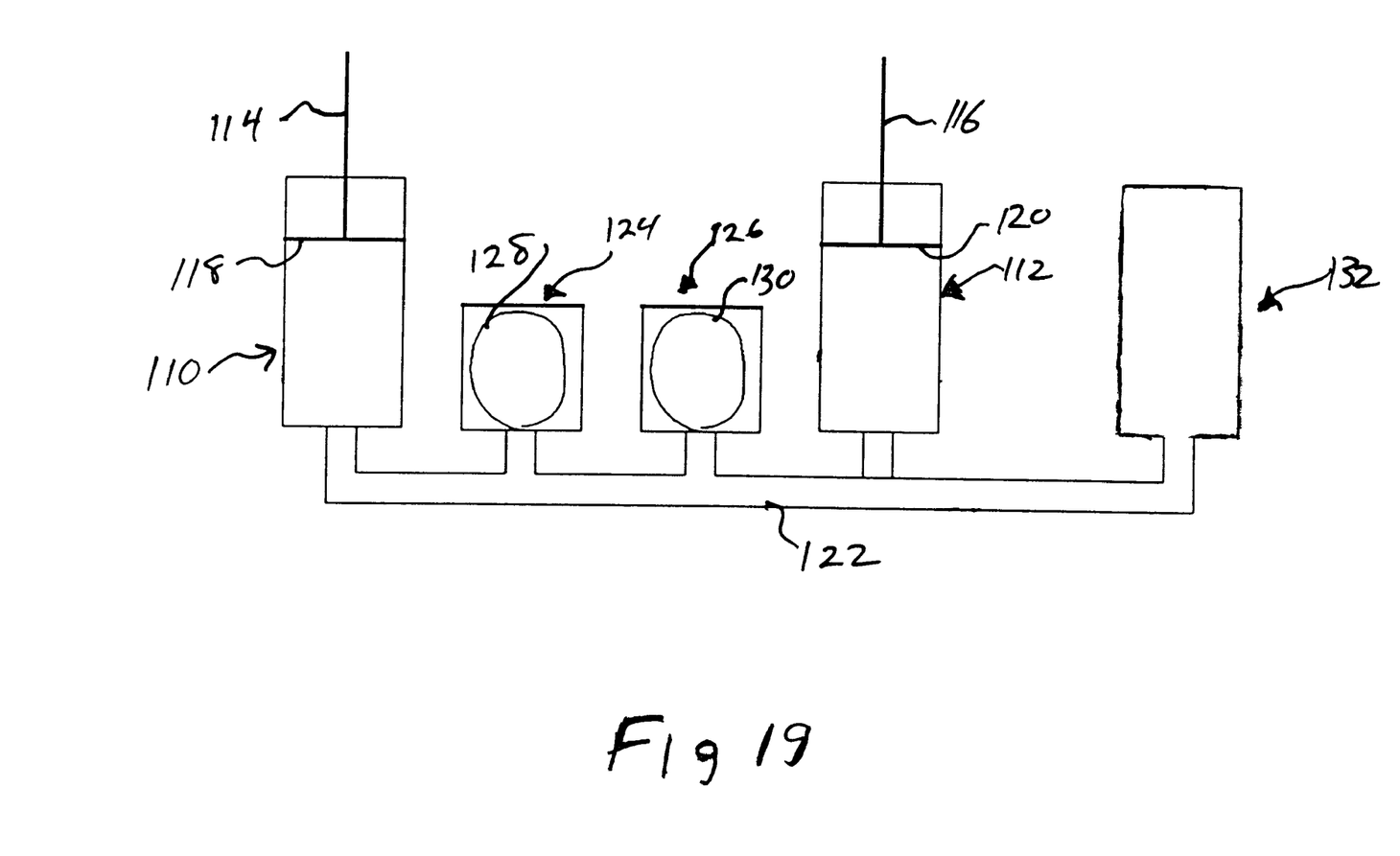
FIG. 19 is a schematic view of a system combining one or more piston and cylinder assemblies adapted to be connected to an impact receiving element and one or more flexible bag assemblies for receiving impact with a single impact energy absorbing device.

FIG. 19 discloses a system showing two piston and cylinder assemblies 110 and 112, wherein the piston rods 114 and 116 may be connected to an impact receiving member such as an automobile bumper or the like. Upon impact, either or both of the pistons 118 and 120 will force the fluid within the assembly outwardly of the cylinders into a common passage 122. Likewise, a pair of flexible bag assemblies 124 and 126 can be located to receive impact in a door panel or the like. Upon impact, fluid within either or both the bags 128 and 130 will also be forced outwardly into the common passage 122. The fluid from one or more of the devices will be forced through the passage 122 into an energy impact absorbing device. The impact absorbing device 132 may be a piston and valve assembly similar to that shown in FIG. 14. The impact energy absorbing device could also be of the type shown in FIG. 18, utilizing a plurality of two-way valves in sequence connected by restricted passages. Any other type of impact energy absorbing device could be used equally as well.

Figure 20:
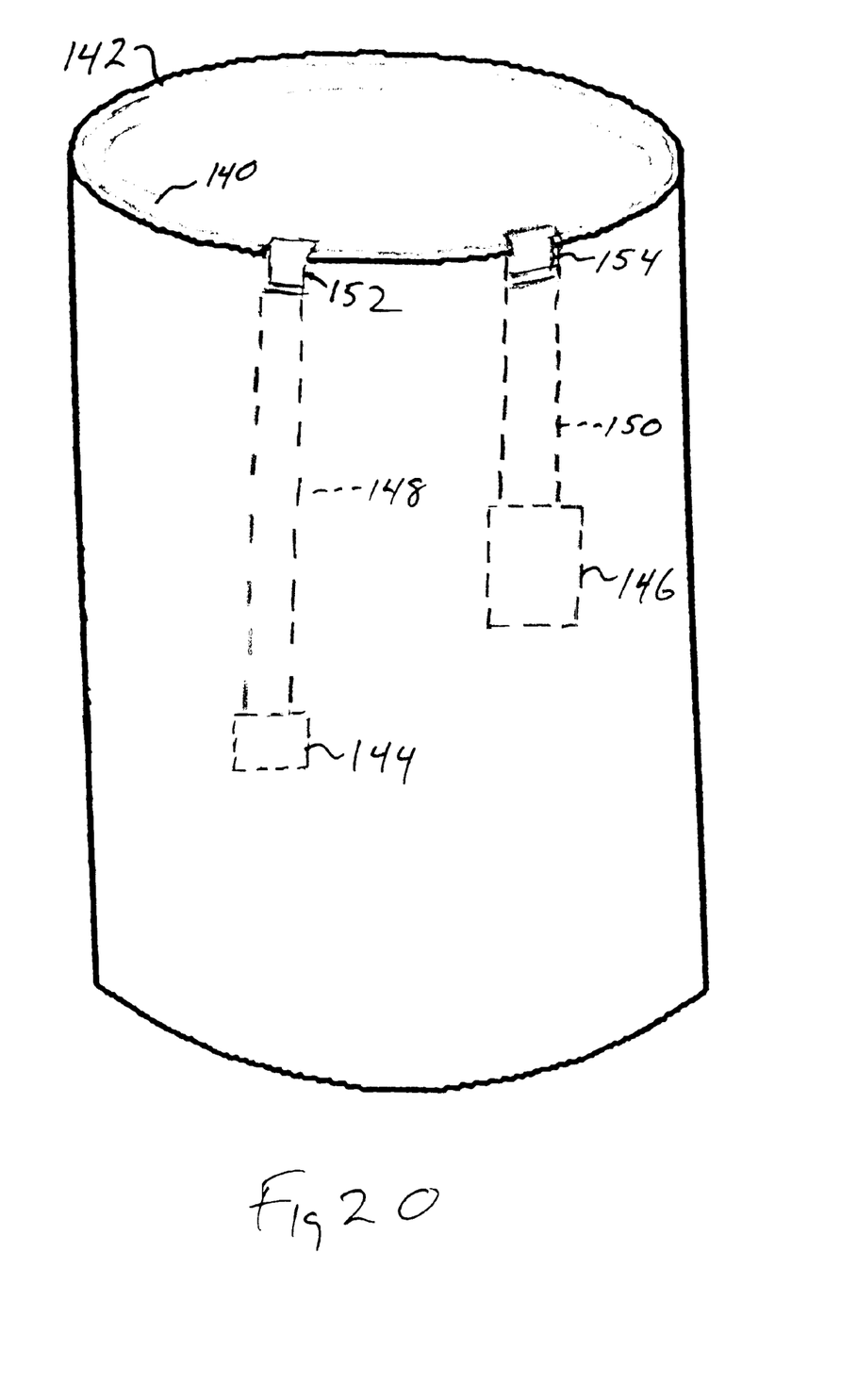
FIG. 20 is a schematic view of a further modification of the embodiment of FIG. 1.

FIG. 20 is a schematic view of a modification of the embodiment of FIG. 1 wherein the plastic cylinder is provided with a cylindrical protective outer sleeve 142, such as metal or the like. A plurality of two-way valves 144 and 146 similar in construction to the valves 20 shown in FIG. 1 are provided in space relation both circumferentially and longitudinally in the cylinder 140. The valves may vary in strength or resistance to opening with the weakest valve being higher on the cylinder wall than the stronger valve. A number of valves may vary depending upon the needs of the situation.

Instead of having the fluid exit the valves 144 and 146 directly into a flexible balloon-like structure similar to that shown in FIG. 1, the fluid will exit from each valve into grooves 148 and 150 respectively, which are recessed into the outer surface of the cylinder 140. The metal sleeve 142 will cover and effectively close the grooves 148 and 150 so that the fluid will be forced along the grooves 144 and 150 to notches or opening 152 and 154 in the upper end of the metal sleeve 142. A circumferentially extending flexible balloon (not shown) similar to the balloon 22 shown in FIG. 1, can be secured through the upper and lower ends of the cylinder 142. Top and bottom walls (not shown) can also be secured to the upper and lower ends of the cylinder 140 with the edges of the balloon secured therebetween.

Thus in use, the fluid forced from the valves 144 and 146 will be subjected to an energy absorbing or dissipating sharing action as the fluid passes through the relatively narrow grooves 148 and 150. The grooves may take a more torturous course along the side wall of the cylinder prior to exiting into the balloon and the cross-section of the groove may vary to provide the desired degree of resistance. Thus, greater impact energy absorbing or dissipating can be achieved by the use of the grooves or any other type of fluid flow restriction.

While the embodiments have been described, any variations thereto which occur to those skilled in the art within the scope of the present inventive concepts which are delineated by the following claims.

What is claimed is:

1. An energy absorbing device comprised of a main cylinder adapted to contain a liquid, a main piston slidably mounted within the main cylinder and having a main piston rod connected thereto for connection to an impact receiving device, a spring mounted within the main cylinder between the main piston and a bottom wall of the main cylinder, at least one opening in a side wall of the cylinder, an outlet valve secured to said main cylinder in overlying relation to said opening for permitting the discharge of fluid from the main cylinder into an elastic balloon which in turn is secured to the outer surface of the main cylinder in surrounding relation to the outlet valve for containing the fluid discharged through the valve for subsequent return to the main cylinder, wherein said main cylinder is comprised of plastic material, wherein a protective sleeve is secured to an exterior surface of said main cylinder to strengthen the main cylinder and wherein a groove is formed in said exterior surface of said main cylinder in communication with said outlet valve to define a restricted passage for the flow of fluid discharge from the main cylinder, said sleeve being provided with an aperture in communication with a remote end of said groove to allow for discharge of the fluid from the groove into said elastic balloon for shearing energy dissipation.

2. An energy absorbing device as set forth in claim 1 wherein a plurality of openings are provided in said side wall of the cylinder in spaced relation lengthwise of the cylinder and wherein the area of each opening is different to vary the energy absorbing response.

3. An energy absorbing device as set forth in claim 1 wherein said impact receiving device is comprised of a flexible liquid filled container having an outlet connected to said main cylinder whereby upon receiving an impact the liquid will be forced from the flexible bag into said main cylinder for moving said main piston.

4. An energy absorbing device comprised of a main cylinder adapted to contain a liquid, a main piston slidably mounted within the main cylinder and having a main piston rod connected thereto for connection to an impact receiving device, a spring mounted within the main cylinder between the main piston and a bottom wall of the main cylinder, at least one opening in a side wall of the cylinder, an outlet valve secured to said main cylinder in overlying relation to said opening for permitting the discharge of fluid from the main cylinder into an elastic balloon which in turn is secured to the outer surface of the main cylinder in surrounding relation to the outlet valve for containing the fluid discharged through the valve for subsequent return to the main cylinder;

wherein said valve assembly is comprised of a two-way valve whereby upon removal of pressure applied to the main piston the spring will restore the main piston to its initial position thereby creating a suction to draw fluid from the balloon into the main cylinder through the valve, and     wherein said two way valve is comprised of upper and lower leaf springs disposed in said opening in overlying relation to each other with the lower leaf spring disposed outwardly of the upper leaf spring, said main cylinder being comprised of plastic material and said upper and lower leaf springs being of integral one-piece molded construction with the cylinder wherein the lower leaf spring is thicker and less flexible than the upper leaf spring and the upper leaf spring has a lower end having an irregular edge to permit the passage of fluid between the upper leaf spring and the lower leaf spring upon outward flexing of the leaf springs due to increased pressure in the cylinder.

5. An energy absorbing device comprised of a main cylinder adapted to contain a liquid, a main piston slidably mounted within the main cylinder and having a main piston rod connected thereto for connection to an impact receiving device, a spring mounted within the main cylinder between the main piston and a bottom wall of the main cylinder, at least one opening in a side wall of the cylinder, an outlet valve secured to said main cylinder in overlying relation to said opening for permitting the discharge of fluid from the main cylinder into an elastic balloon which in turn is secured to the outer surface of the main cylinder in surrounding relation to the outlet valve for containing the fluid discharged through the valve for subsequent return to the main cylinder;

wherein said valve assembly is comprised of a two-way valve whereby upon removal of pressure applied to the main piston the spring will restore the main piston to its initial position thereby creating a suction to draw fluid from the balloon into the main cylinder through the valve, and     wherein said two way valve is comprised of upper and lower leaf springs secured to an exterior surface of the main cylinder in overlying relation to said opening with said upper leaf spring disposed inwardly of said lower leaf spring, said upper leaf spring having a greater degree of flexibility than said lower leaf spring and being provided with an uneven lower edge to provide for the passage of fluid outwardly from said main cylinder upon outward flexing of said upper and lower leaf springs with the lower edge of the upper leaf spring engaging an inner surface of said lower leaf spring, said upper leaf spring being free to flex inwardly upon creation of a suction in the main cylinder to allow the fluid to return to the main cylinder.

\* \* \* \* \*